R. A. BECKER.
TRANSMISSION LINE CONNECTOR.
APPLICATION FILED NOV. 27, 1916.
1,251,464. Patented Jan. 1, 1918.
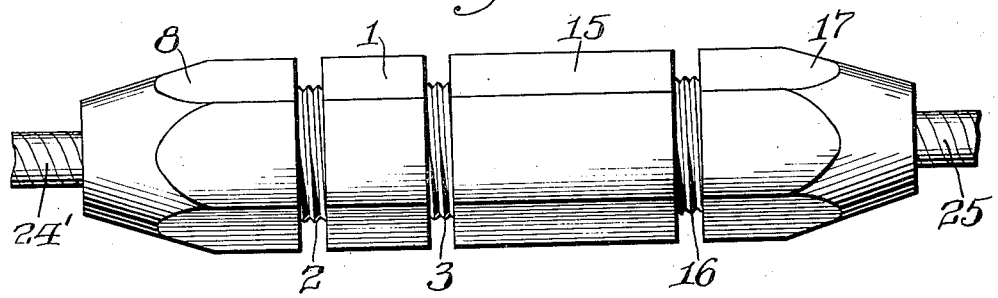
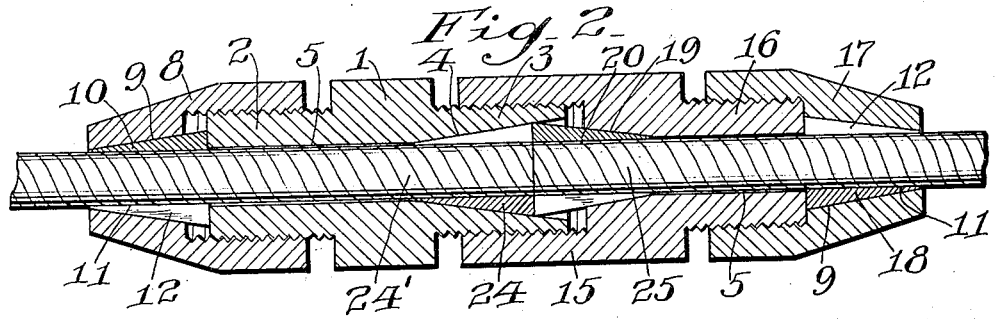
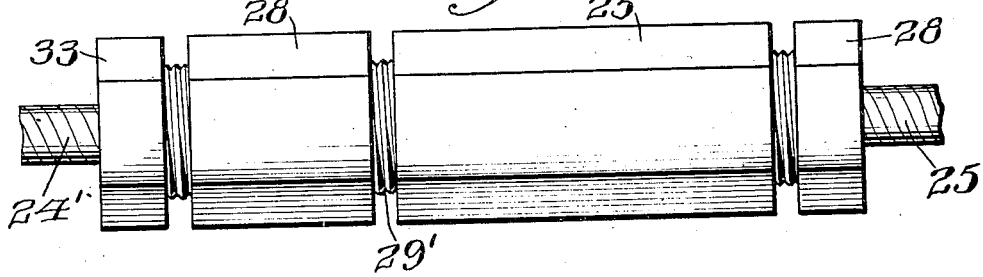
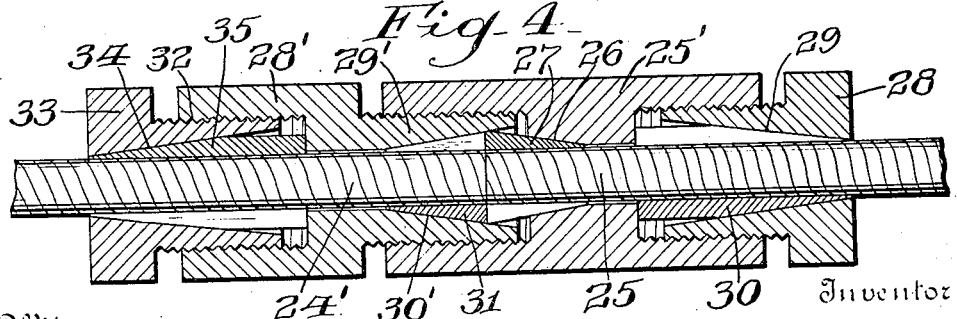
Witnesses
Inventor
Robert A. Becker,
By J. Stuart Freeman,
Attorney

UNITED STATES PATENT OFFICE.

ROBERT A. BECKER, OF POUGHKEEPSIE, NEW YORK, ASSIGNOR TO CHARLES TREMAIN, OF POUGHKEEPSIE, NEW YORK.

TRANSMISSION-LINE CONNECTOR.

1,251,464.     Specification of Letters Patent.     Patented Jan. 1, 1918.

Application filed November 27, 1916. Serial No. 133,634.

*To all whom it may concern:*

Be it known that I, ROBERT A. BECKER, a citizen of the United States, residing at Poughkeepsie, in the county of Dutchess and State of New York, have invented certain new and useful Improvements in Transmission-Line Connectors, of which the following is a specification.

In the construction of electric transmission lines, and particularly those designed to convey currents of relatively high tension, it is customary to employ spans between the supporting poles or towers of considerably greater length than those normally found in low tension installations.

With the existence of such a condition, it is obvious that the longitudinal tension upon the respective lines due to weight of the span is sufficient to tax the ingenuity of engineers when designing a connector for the purpose of uniting the ends of adjacent lengths of cable.

This is particularly true when the connector is to be of that type in which the union of the two ends is with their axes of symmetry in alinement, with which no solder or similar joining material is used, and when it is desired to preserve a condition wherein the respective ends upon breaking the joint will be the same as before uniting, or without showing mutilation of any sort.

The object of this invention, therefore, has been to provide a device which, while of the simplest possible construction consistent with great strength, will effect the desired union with the required degree of efficiency in possessing high conductivity, and in every way be equal to, and capable of fulfilling, the most exacting demands of the service.

With these facts in mind, the invention in its preferred form of embodiment has been made to comprise the various details of construction and possess numerous advantages in its operation, as partially covered by the following description, when read in conjunction with the accompanying drawings in which Figure 1 is an elevation of one form of the device; Fig. 2 is a longitudinal section of the same; Fig. 3 is an elevation of a modified form of the device shown in Fig. 1; and Fig. 4 is a longitudinal section of the form shown in Fig. 3.

Referring particularly to Figs. 1 and 2 of the drawings, the preferred form of the invention comprises a member 1, provided with longitudinal, axially extending, reduced externally threaded portions 2 and 3, the latter of which is provided with a central inwardly tapering aperture 4, leading into a bore 5 which extends throughout the full length of said member.

Upon the extension 2 is adapted to be screwed an internally threaded cap 8, provided with a tapering bore 9 in which is positioned a ring 10, having an axial bore 11 and longitudinally split at 12, to make its radial expansion and contraction readily accomplished, while the outer surface of its walls taper to substantially conform to the tapering bore 9 of said cap, said ring normally coöperating with the end of the said extension 2 of the member 1.

A member 15 is internally threaded at one end to coöperate with the extension 3 of the member 1, and reduced at 16 and externally threaded to receive the cap 17, which is similar to the cap 8, and adapted to receive the contracting ring 18, which in turn is similar to the ring 10. The central portion of said last-named member is provided with an inwardly tapering bore 19, in which is positioned a third ring 20, normally coöperating with a fourth ring 24, positioned in an inwardly tapering bore within the extension 3 of the member 1.

In the operation of this invention, the respective interengaging members 1 and 15, together with the caps 8 and 17, are assembled and loosely screwed together in the relative positions shown with the respective tapering contractible rings situated as indicated. The opposite ends 24 and 25 of two wires, cables, or the like, are then inserted substantially equal distances into the device until they preferably entirely meet. Then the two intermediate members are preferably screwed together, which action forces the central pair of rings into their respective tapering bores and contracts them about the end portions of said cables.

When this has been accomplished, the two caps are screwed into place, thus contracting the extreme rings by their coöperation with the end faces of the respectively adjacent intermediate members. In this way a bond is obtained which causes a cable to part at any other point rather than within the connector, while the conductivity is so high that no increase in temperature is insured, even with the passage of extremely high currents of electricity, over and above that which the outside portions of the cable may experience. If it is not objectionable to have the said cables twist during the joining of the two inner members, the outer caps may be secured in place first, in which case the ends of the cables are more firmly forced together in a form of cold weld.

In the form of the device shown in Figs. 3 and 4 a member 25' is axially apertured at 26, the same tapering in one direction and adapted to receive a gripping ring 27, while the end portions of said member surround internally threaded enlargements of said first aperture, one of them receiving a plug 28, which in turn is provided with an outwardly tapering aperture 29 in which is located a second gripping ring 30, at its larger end coöperating with the adjacent inner wall of the said member 25'.

Another member 28' has a reduced end portion 29' provided with an axially extending tapering bore 30' adapted to contain a third contractible gripping member 31. The aperture in the opposite end of the said member is enlarged and internally threaded at 32 to receive an externally threaded plug 33, provided with an outwardly tapering aperture 34 in which is located a fourth gripping member 35, adapted to coöperate with the adjacent wall of the said member 28'.

As in the case of the first form of the invention, in assembling this device the ends of two wires or cables are inserted from the opposite extremities and the central adjacent members are screwed together until the said cables are positively gripped to the utmost possible extent. Then the outer plugs are turned up, thereby additionally gripping the cables with the outer gripping contractible rings, with the same result as hereinbefore described.

Having thus described my invention, what I claim and desire to protect by Letters Patent of the United States is:

1. A pair of interlocking members, gripping means within said members, members adapted to be secured to the opposite ends of said pair, and gripping means within said last-named members.

2. A pair of interlocking members, gripping means within each of said members, members adapted to be secured to the opposite ends of said pair, and gripping means within each of said last-named members.

3. A pair of interlocking members, gripping means within each of said members, actuated by the joining of said first members, members adapted to be secured to the opposite ends of said pair, and gripping means actuated by the joining of said last-named members to said pair.

4. A pair of interlocking members provided with oppositely tapering bores, tapering contractible means within each of said bores and coöperating with each other as said members are joined together, members adapted to be joined to the opposite ends of said first members and being provided with outwardly tapering bores, and tapering contractible means within each of said bores and coöperating with the adjacent walls of said first members as the latter said second members are joined.

5. A pair of members joined together in threaded relation, gripping means within each of said members actuated by the screwing together of said members, caps adapted to be screwed upon the opposite ends of said first members and gripping means within each of said caps and contracted by the joining of said caps to said members.

6. A pair of members joined together in threaded coöperation and provided with coöperating tapered gripping tapering bores, coöperating tapered gripping means within said bores, and actuated by the joining of said members, caps provided with tapering bores and adapted to be screwed upon the opposite ends of said members, and tapered gripping means within said last-named bores and operative to contract upon joining said caps to said members.

In testimony whereof I have affixed my signature in presence of two witnesses.

ROBERT A. BECKER.

Witnesses:
LAURENCE E. SHERWOOD,
ANNA G. W. DAYLEY.